(12) United States Patent
Calegari et al.

(10) Patent No.: US 11,438,441 B2
(45) Date of Patent: Sep. 6, 2022

(54) DATA AGGREGATION METHOD AND SYSTEM FOR A UNIFIED GOVERNANCE PLATFORM WITH A PLURALITY OF INTENSIVE COMPUTING SOLUTIONS

(71) Applicant: BULL SAS, Les Clayes-sous-Bois (FR)

(72) Inventors: Patrice Calegari, Boissy-sous-Saint-Yon (FR); Marc Levrier, Saint-Cyr-sous-Dourdan (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 17/132,457

(22) Filed: Dec. 23, 2020

(65) Prior Publication Data

US 2021/0203739 A1 Jul. 1, 2021

(30) Foreign Application Priority Data

Dec. 27, 2019 (FR) ...................................... 1915662

(51) Int. Cl.
*H04L 67/566* (2022.01)
*H04L 9/40* (2022.01)
(Continued)

(52) U.S. Cl.
CPC .......... *H04L 67/566* (2022.05); *H04L 63/101* (2013.01); *H04L 67/306* (2013.01); *H04L 67/561* (2022.05)

(58) Field of Classification Search
None
See application file for complete search history.

(56) References Cited

U.S. PATENT DOCUMENTS 10,129,078 B2 * 11/2018 Kumar ...................... G06F 8/30
10,827,020 B1 * 11/2020 Cao ..................... H04L 67/2838
(Continued)

FOREIGN PATENT DOCUMENTS

| EP | 2254310 A2 | 11/2010 |
| EP | 3109759 A1 | 12/2016 |
| WO | 2013158707 A1 | 10/2013 |

OTHER PUBLICATIONS

French Search Report issued in corresponding French Application No. FR1915662 dated Sep. 11, 2020, 2 pages.

*Primary Examiner* — James A Edwards
(74) *Attorney, Agent, or Firm* — ARC IP Law, PC; Joseph J. Mayo

(57) ABSTRACT

The invention relates to a system and a method for generating an aggregated data accessible at an aggregated interface (10) of a user client (2) within the framework of unified governance of a plurality of intensive computing solutions (70), said generation method including the steps of: Receiving (210), by a proxy microservice (20), access command information of a user client (2), contained in a message coming from an aggregated interface (10), Determining (220) data accessible to the user client (2) based at least partly on the access command information, Determining (230) data to be aggregated from the accessible data determined by each of the computing microservices (50, 51, 52, 53), Generating (240) an aggregated data from the data to be aggregated from the accessible data, and Transmitting (250) the aggregated data, by the proxy microservice (20), to the aggregated interface of the user client (10).

18 Claims, 6 Drawing Sheets

(51) Int. Cl.
*H04L 67/306* (2022.01)
*H04L 67/561* (2022.01)

(56) References Cited

U.S. PATENT DOCUMENTS

| | | | |
|---|---|---|---|
| 10,949,382 B2* | 3/2021 | Hammer | G06F 16/13 |
| 10,949,951 B2* | 3/2021 | Tang | G06T 5/002 |
| 10,985,853 B2* | 4/2021 | Bretherton | H04N 21/44218 |
| 11,061,717 B2* | 7/2021 | Festa | G06F 21/31 |
| 2013/0159380 A1 | 6/2013 | Alam et al. | |
| 2017/0139974 A1* | 5/2017 | Javed | G06F 3/04817 |
| 2017/0177546 A1* | 6/2017 | Heinz | G06N 20/00 |
| 2019/0004871 A1* | 1/2019 | Sukhomlinov | G06F 9/5038 |
| 2019/0245918 A1* | 8/2019 | Xu | H04L 67/1002 |
| 2019/0306138 A1* | 10/2019 | Carru | H04L 63/0807 |
| 2020/0133492 A1* | 4/2020 | Bernat | G06F 3/0652 |
| 2021/0042207 A1* | 2/2021 | Joyce | G06F 21/53 |
| 2021/0135971 A1* | 5/2021 | Martin | H04L 43/50 |

* cited by examiner

DATA AGGREGATION METHOD AND SYSTEM FOR A UNIFIED GOVERNANCE PLATFORM WITH A PLURALITY OF INTENSIVE COMPUTING SOLUTIONS

The invention relates to the field of high performance computing and more particularly to the interfacing to a single platform of several intensive computing solutions having different business logics. The invention concerns in particular a method for generating an aggregated data accessible at an aggregated interface of a user client within the framework of a platform centralizing the access to a plurality of intensive computing solutions. Furthermore, the invention concerns an aggregated data generation computer system capable of generating an aggregated data accessible at an aggregated interface of a user client within the framework of a platform centralizing the access to a plurality of intensive computing solutions.

PRIOR ART

The High Performance Computing, also called HPC is being developed for university research as well as for industry, in particular in technical fields such as aeronautics, energy, climatology and life sciences. This computing is generally implemented by clusters. The objective of these clusters is to overcome the limitations on the existing hardware by pooling resources to allow the parallel execution of instructions and the memory capacity and disk aggregation. A cluster is a set of computing means (also called nodes or servers) interconnected by an interconnection network that can perform common operations. The High Performance Computing (HPC) is adopted by more and more scientists to help them solve their complex problems. Particularly, with an increase between 2017 and 2018 of more than 50% of the power of the most powerful computer in the world, the computing power of the supercomputers is constantly increasing. In addition, there is an increasing number of computing centers (local, regional, national and international centers) equipped with petaflop-class systems. Since it is not possible for all the users to invest in the computer architectures capable of deploying such computing powers, some have specialized in providing access to these high performance computing solutions.

Thus, the last few years witnessed the emergence of platforms of access to intensive computing solutions (EP3109759). Particularly, many HPC portals have been developed. Internet portals are a common way to access the information and the services available on the computer networks. The portals often provide a single point of access to the data and applications. Furthermore, a portal can present a unified and customized view of information to the users.

Many HPC projects are developing their own community-specific Web portal and some HPC cloud providers have developed Web portals for their own use. The relationships between the portal and these information and storage systems are essential but complex to implement in a secure and efficient manner. The data processed in HPC environments can be very confidential (particularly for industries or financial organizations). The HPC portals need to manage these constraints in the way they execute the services on the main server (via impersonation, i.e. they execute the service "as" authenticated user), as well as in the way they display or filter the information in the HPC portal.

Furthermore, beyond the computing power and the high performance computing, the user scientists wish to be able to access intensive computing solutions such as quantum machines, quantum simulation, Deep Learning platforms or more broadly dedicated to the development of artificial intelligence solutions.

However, each of these solutions is hosted or made accessible by companies dedicated to either of these technologies and the use, in particular simultaneous use, of these different intensive computing solutions, becomes laborious.

Thus, with the proliferation of the typologies of intensive computing solutions and the complementarity of some of these solutions, it appears necessary to have a platform allowing indifferently accessing different intensive computing solutions in a homogenous and transparent manner without information redundancy.

TECHNICAL PROBLEM

The aim of the invention is therefore to overcome the drawbacks of the prior art. Particularly, the aim of the invention is to propose a method for generating an aggregated data accessible at an aggregated interface of a user client, in particular within the framework of unified governance of a plurality of intensive computing solutions, said method making it possible to effectively aggregate the access to the results of a plurality of intensive computing solutions. The aim of the invention is also to propose a system for generating an aggregated data accessible at an aggregated interface of a user client. Such a system allows eliminating the data redundancy between the intensive computing solutions and leaving complete latitude for scalable ergonomics adapted to each new intensive computing solution.

BRIEF DESCRIPTION OF THE INVENTION

To this end, the invention relates to a method for generating an aggregated data accessible at an aggregated interface of a user client within the framework of unified governance of a plurality of intensive computing solutions, said intensive computing solutions including at least two solutions selected among: a high performance computing server, a server dedicated to supervised or unsupervised learning and a server dedicated to quantum computing, the unified governance being ensured at least partly by a computer system for generating an aggregated data including: a proxy microservice and at least one computing microservice for each of the intensive computing solutions, said generation method including the steps of:
Receiving, by the proxy microservice, access command information of a user client, contained in a message coming from an aggregated interface,
Determining data accessible to the user client, by each of the computing microservices, said determination being based at least partly on the access command information,
Determining data to be aggregated, by the proxy microservice, from the accessible data determined by each of the computing microservices,
Generating an aggregated data from the data to be aggregated, by the proxy microservice, from the accessible data determined by each of the computing microservices, and
Transmitting the aggregated data, by the proxy microservice, to the aggregated interface of the user client.

The method according to the invention is implemented within the framework of unified governance of a plurality of intensive computing solutions that allow exposing, according to a single model, models and fields of very varied intensive or high performance computing applications: High Performance Parallel Computing, Artificial Intelligence, Deep Learning and quantum computing simulation. This unified governance allows general convergence of various fields seeking to exploit the power and flexibility of computing clusters or supercomputers as well as their cloud use.

The existing platforms for access to intensive computing solutions are specialized in a particular computing method and the software architectures concerned are not capable of managing the complexity of interacting with several computing intensive solutions.

Likewise, while microservices are used in many areas of IT, they have not been offered in a single architecture capable of aggregating data from or to different intensive computing solutions, each with their own specificities.

Indeed, in the absence of a suitable structure, it is not easy to design an architecture capable of managing the specificities of each of the intensive computing solutions while coordinating them from a single point. Thus, current solutions are not capable of managing the schedulers of several intensive computing solutions and processing flows representing very heterogeneous system loads on equally heterogeneous hardware. Likewise, architectures, based exclusively on microservices, offered in other areas of IT are not applicable to a solution that must aggregate several intensive computing solutions.

Moreover, a microservice corresponds by definition to a service that can "fit" in a virtual machine or a container, these two objects can never allocate more physical resources than the physical server (node) that hosts them. Conversely, a single scientific computation job, especially for a parallel distributed memory application (the most important case), aggregates the power of several tens, hundreds or thousands of these physical servers (nodes). Conversely, it is akin to a macro-job and is thus in total opposition to the various virtualization models that have made it possible to popularize the microservice approach.

Finally, most scientific computing applications, in particular in the very broad field of trades using digital simulation, have been developed on very old models (20, 30 years or even more), totally unsuitable for a connected, orchestrated or based on dynamic discovery. Most of these applications can be not integrated into a microservices framework. The idea here is to develop all of the state of the art middleware, themselves in the form of microservices, to drive a large number of applications on one or more high-performance infrastructures that can not themselves conform to this model.

The present invention allows to overcome the drawbacks thanks to a complementary use of the computing microservices, each being dedicated to an intensive computing solution cooperating with a proxy microservice and an aggregated interface.

Particularly, the method according to the invention allows a generation of aggregated data from an interface aggregating the access to several intensive computing solutions.

Such a method allows eliminating the data redundancy between the intensive computing solutions, whether towards intensive computing solutions or towards a user client. Furthermore, such a solution allows having scalable ergonomics, adapted to each new intensive computing solution.

Thus, the method according to the invention allows a solution proposing a single entry point towards the different business logics (backends) and this with unified ergonomics (e.g. standardized workflow buttons, menus, logics . . . ).

Furthermore, in addition to providing an aggregated interface that allows integrating several intensive computing solutions and making them compatible with the classic software products, the presence of the different abstraction layers in the form of microservices allows a standardization of the exchanges and a standardization of the views (interfaces).

According to other Optional Characteristics of the Method:

the determination of data to be aggregated implements a keyword repository including correspondences between accessible data for each of the computing microservices. The use of such a keyword repository allows accelerating the determination of the data to be aggregated and centralizing the endpoints and arguments used by the computing microservices and the proxy microservice.

the method further includes the following steps:
  Determining redundant data, by the proxy microservice, from the accessible data determined by each of the computing microservices, and
  Transmitting a single copy of each of the redundant data, by the proxy microservice, to the aggregated interface of the user client.

This accelerates the implementation of the method and limits the transfers of data streams so as to limit the occupation of the bandwidth particularly at the unified governance computer system.

the method further includes the following steps:
  Transmitting the accessible data, by the proxy microservice, to the aggregated interface of the user client; and
  Determining redundant data, by the aggregated interface, from the accessible data transmitted by the proxy microservice.

In this case, it is the aggregated interface that is responsible for selecting only one version of the redundant data. This reduces the processing load at the unified governance computer system.

the computer system for generating an aggregated data further includes at least one authorization repository, the generation method further includes the following steps:
  Receiving, by the proxy microservice, an action command generated by the user client and contained in a message coming from the aggregated interface;
  Identifying authorized actions, by each of the computing microservices, said identification being based at least partly on the action command and on an authorization repository;
  Generating a transformed action command, by each of the computing microservices having identified an authorized action; and
  Transmitting the transformed action command, by each of the computing microservices, to the intensive computing solutions concerned.

Thus, from a single command issued by the user client, the unified governance system will be able to give instructions to each of the intensive computing solutions concerned by this command. This therefore contributes to the homogenized, transparent and secure access to a plurality of intensive computing solutions from a single aggregated interface.

the aggregated data is selected among:
Computing input files accessible and processable by several intensive computing solutions;
Computing results accessible and processable by several computing microservices;
Energy consumption measurements;
Resource use measurements;
System parameters;
Descriptions of the hardware infrastructures;
Use Index data for the intensive computing processes; and
Duration data before completion of the computing.

the computer system for generating an aggregated data further including a token security microservice, at least one security repository and at least one authorization repository, said method including a procedure for managing the authorizations granted to a user client including the steps of:
Receiving, by the token security microservice, access information of a user client,
Authenticating the user client and determining, by the token security microservice, at least one role attribute for the user client from the access command information and data stored in the security repository,
Generating a token, by the token security microservice, said token allowing an access to all the intensive computing solutions accessible to said user client based on the at least one determined role attribute, and
Determining authorizations granted to the user client, by the at least one computing microservice, said determination being based on the at least one determined role attribute and data contained in the at least one authorization repository.

Such a procedure allows a single sign on for all the microservices with a single management of the roles and identities. For that purpose, one part of the security verification of the unified governance in an execution environment is advantageously carried out by the token security microservice of the computer system for generating an aggregated data. Particularly, security is ensured via an authorization framework that can be based on a role management, an authorization policy management, a token-based control mechanism, a delegation of the management of the identities and a delegation of the authentication mechanisms. This process allows coupling a very flexible and generic (ensured by the security microservice) and very accurate (ensured by each of the intensive computing solution microservices) authentication. Indeed, the token security microservice allows assigning a role but it is not able to perform a fine-grained assignment of authorizations to each of the functionalities of the different intensive computing solutions. The token security microservice is then for example completed by a catalog of special authorizations in the computing microservices. This catalog can be implemented as a table in the database of the backend (either in its own microservice or in a dedicated microservice). Thus, the method according to the invention proposes an authorization management within the framework of a solution proposing a single entry point towards the different business logics (backends) and this with unified ergonomics (e.g. standardized workflow buttons, menus, logics . . . )

the access information of a user client comes from a message sent from an aggregated interface of the user client to the proxy microservice. Thus, the information passes through the proxy microservice within which it can be stored. Alternatively, the access information of a user client comes from a message sent from an aggregated interface of the user client directly to the token microservice. This allows simplifying the authorization procedure.

the message coming from the user client includes identification data of the user client. This allows determining from which hardware device the connection is required.

Other implementations of this aspect comprise computer systems, apparatuses and corresponding computer programs recorded on one or several computer storage devices, each being configured to perform the actions of a method according to the invention. Particularly, a system of one or several computers can be configured to perform particular operations or actions, in particular a method according to the invention, through the installation of a software, firmware, hardware or a combination of software, firmware or hardware installed on the system.

Furthermore, one or several computer programs can be configured to perform particular operations or actions through instructions which, when executed by a data processing apparatus, cause the apparatus to perform the actions.

Thus, the invention also relates to a computer system for generating an aggregated data accessible at an aggregated interface of a user client within the framework of unified governance of a plurality of intensive computing solutions, said intensive computing solutions including at least two solutions selected among: a high performance computing server, a server dedicated to supervised or unsupervised learning and a server dedicated to quantum computing; the unified governance being ensured at least partly by the computer system for generating an aggregated data, said system including:
at least one computing microservice for each of the intensive computing solutions, the at least one computing microservice being configured to determine data accessible to the user client, said determination being based at least partly on access command information, and
a proxy microservice configured to:
Receive a message coming from an aggregated interface, said message including access command information of a user client,
Determine data to be aggregated from the accessible data determined by each of the computing microservices,
Generate an aggregated data from the data to be aggregated from the accessible data determined by each of the computing microservices, and
Transmit the aggregated data to the aggregated interface of the user client.

Such a system allows unified governance by allowing general convergence of various fields seeking to exploit the power and flexibility of the computing clusters or supercomputers, as well as their cloud use. Particularly, such a system according to the invention allows a generation of aggregated data from an interface aggregating the access to several intensive computing solutions. It allows eliminating the data redundancy between the intensive computing solutions whether towards the intensive computing solutions or towards a user client. Furthermore, such a solution allows having scalable ergonomics adapted to each new intensive computing solution.

Other advantages and characteristics of the invention will become apparent upon reading the following description given by way of illustrative and non-limiting example, with reference to the appended figures.

Figure 1:
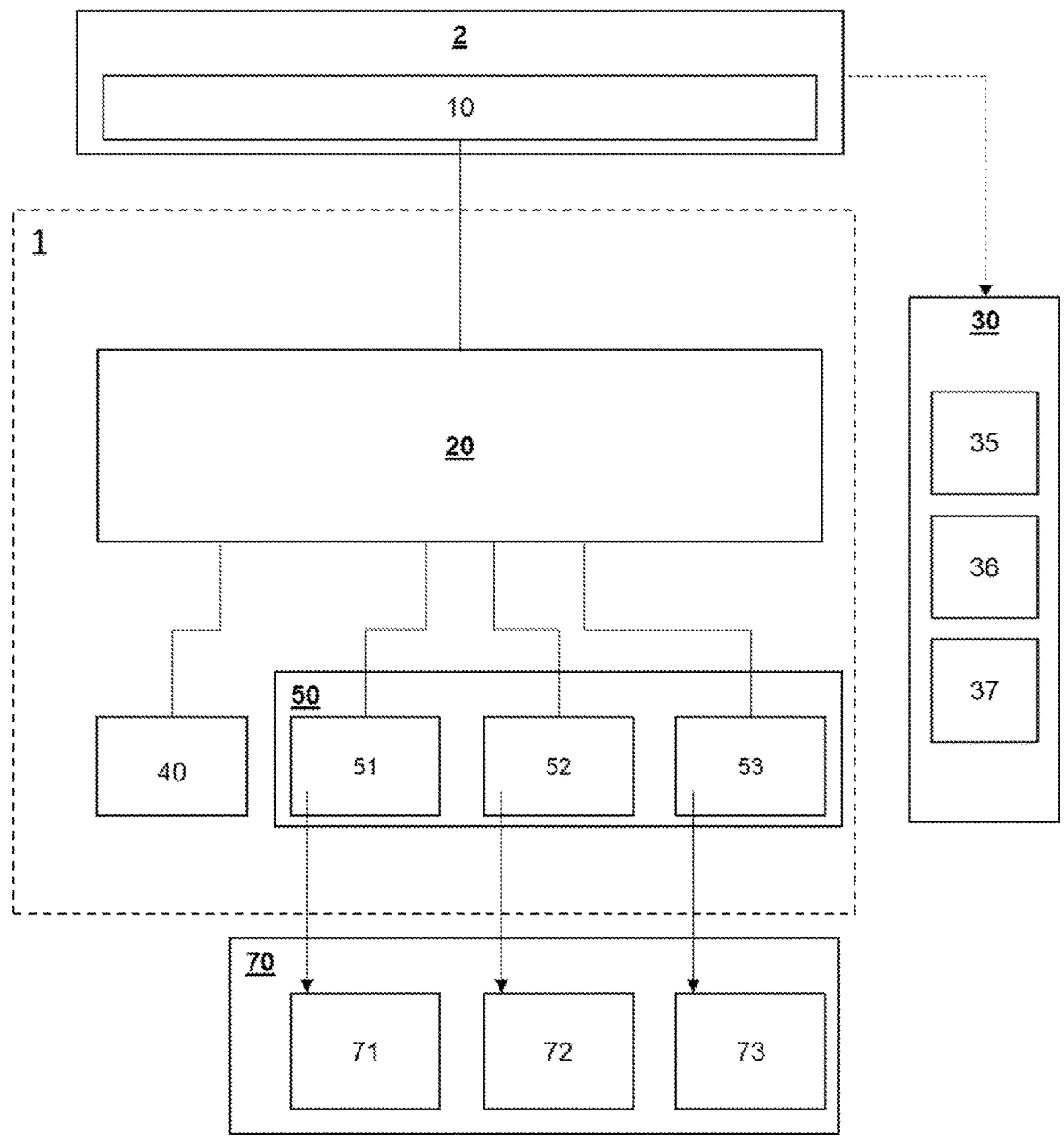
FIG. 1 represents a diagram of a computer system for generating an aggregated data according to the invention.

Aspects of the present invention are described with reference to flowcharts and/or to block diagrams of methods, apparatuses (systems) and computer program products according to embodiments of the invention.

In the figures, the flowcharts and the block diagrams illustrate the architecture, functionality, and operation of possible implementations of systems, methods and computer program products according to various embodiments of the present invention. In this regard, each block in the flowcharts or block diagrams can represent a system, a device, a module or a code, which comprises one or several executable instructions for implementing the specified logical function(s). In some implementations, the functions associated with the blocks can appear in a different order than the one indicated in the figures. For example, two blocks successively shown can, in fact, be executed substantially simultaneously, or the blocks can sometimes be executed in the reverse order, depending on the functionality involved. Each block of the schematic diagrams and/or of the flowchart, and combinations of blocks in the schematic diagrams and/or the flowchart, can be implemented by special hardware systems that execute the specified functions or acts or perform combinations of special hardware and computer instructions.

DESCRIPTION OF THE INVENTION

In the remainder of the description, the expression "management of the authorizations" corresponds, within the meaning of the invention, to the ability to manage, based on predetermined rules, the access to the intensive computing solutions on the one hand and the user rights on these solutions such as reading, writing, copy, execution, modification and full control.

The term "aggregated" or "aggregation" can correspond to the fact of presenting data coming from many different origins in a single location. The aggregation can also correspond to the creation of a new data from at least two different data. For example, this can correspond to a total duration before completion of a computing project, said total duration taking into account the duration before completion on a first intensive computing server and the duration before completion on a second intensive computing server, the two durations are not simply added together.

The expression "aggregated interface" or "aggregation interface" can designate within the meaning of the invention a graphical man-machine interface benefiting from a method for collecting and aggregating information coming from the intensive computing solutions. Furthermore, an aggregated interface can benefit from the organization of the information according to one of the characteristics of the screen displaying said interface.

The term "Data(s)" corresponds to one or several files or one or several parameter values. The parameter values being intended for the intensive computing solutions, generated by intensive computing solutions or even generated from data of the intensive computing solutions. The data within the meaning of the invention can particularly correspond to input computing files accessible and processable by several intensive computing solutions, computing results accessible and processable by several intensive computing solutions, duration data before completion of the computing, values derived from energy consumption measurements, resource use measurement values (network bandwidth, storage inputs/outputs, memory, CPU, GPU, etc.), billing information, system parameter values particularly systems implementing the intensive computing solutions or even parameter values of hardware infrastructures hosting the intensive computing solutions.

The expression "intensive computing solution" preferably corresponds to computer infrastructures capable of executing intensive or high performance computing such as: High Performance Parallel Computing, Artificial Intelligence, Deep Learning, quantum computing and quantum computing simulation.

The term "microservice" corresponds to an application chain generally including a plurality of applications capable of executing one or several tasks. The microservices can be linked together through APIs such as an API REST. The presence within the framework of the invention of microservices allows conferring a strong modularity and scalability to the solution, in particular with regard to the involvement of potentially very different intensive computing solutions.

The expression "Web portal" or more simply "Portal" can designate an access tool for accessing different types of information and applications via a client system from the resources of the network. A tool for displaying a portal page can be a Web browser. However, a portal can also be integrated into other applications. The portals within the meaning of the invention are advantageously capable of presenting data from several sources such as Web applications in a single aggregated Web or browser interface. Furthermore, a portal provides the possibility of displaying portlets in the aggregated interface. The configuration of the portal can include a portal definition with for example a file including extensible markup language (XML), the portlet definition files for all the portlets associated with the portal, the Java server pages (JSP), the Web application descriptors, images such as the graphics interchange format (GIFs) files, the deployment descriptors, the configuration files, the Java ARchive (JAR) files that contain logic and formatting instructions for the portal application, and all the other files needed for a desired portal application.

The term "portlet" can designate connectable user interface software components that are managed and displayed in a Web portal. A portal page can be displayed as a collection of non-overlapping portlet windows, where each portlet window displays a portlet. Accordingly, a portlet (or collection of portlets) looks like a Web-based application that is hosted in a portal.

The term "request" can designate a request for information, generally identified by a "link" on a portal page. A request can be initiated by a "click" on a displayed symbol associated with the "link".

The expression "man-machine interface" within the meaning of the invention corresponds to any element allowing a human being to communicate with a particular computer and without this list being exhaustive, a keyboard and means allowing, in response to the orders entered using the keyboard, to display and potentially select elements displayed on the screen using the mouse or a touchpad. Another exemplary embodiment is a touch screen that allows selecting directly on the screen the elements touched by the finger or an object and potentially with the possibility of displaying a virtual keyboard.

The term "client side" can designate activities that can be performed on a client in a client-server network environment. Accordingly, the activities that can be executed can be indicated by the term "on the server side" on a server in a client server network environment.

The term "plurality" within the meaning of the invention corresponds to at least two. Preferably, this can correspond to at least three, more preferably at least five and even more preferably at least ten.

It is meant by "process", "calculate", "execute", "determine", "display", "extract", "compare" or more broadly "executable operation", within the meaning of the invention, an action performed by a device or a processor unless the context indicates otherwise. In this regard, the operations relate to actions and/or processes of a data processing system, for example a computer system or an electronic computer device, which manipulates and transforms the data represented as physical (electronic) quantities in the memories of the computer system or other devices for storing, transmitting or displaying the information. These operations can be based on applications or software.

The terms or expressions "application", "software", "program code" and "executable code" mean any expression, code or notation, of a set of instructions intended to cause a data processing to perform a particular function directly or indirectly (e.g. after an operation of conversion to another code). The program code examples can include, but are not limited to, a subroutine, a function, an executable application, a source code, an object code, a library and/or any other sequence of instructions designed for the execution on a computer system.

It is meant by "processor", within the meaning of the invention, at least one hardware circuit configured to execute operations according to instructions contained in a code. The hardware circuit can be an integrated circuit. Examples of a processor comprise, but are not limited to, a central processing unit, a graphic processor, an application-specific integrated circuit (ASIC), and a programmable logic circuit.

It is meant by "coupled", within the meaning of the invention, connected, directly or indirectly with one or several intermediate elements. Two elements can be coupled mechanically, electrically or linked by a communication channel.

In the remainder of the description, the same references are used to designate the same elements.

As has been mentioned, there are many intensive computing solutions available and accessible to the occasional users. However, there is no platform for unifying the access to a plurality of intensive computing solutions in a homogeneous and secure manner.

The inventors have therefore proposed a computer system 1 for generating an aggregated data allowing, via the use of a plurality of microservices, unified governance and an aggregated interface for the access to a variety of services from third-party providers of intensive computing solutions.

The intensive computing solutions generate a large amount of data whether it is data obtained when achieving the intensive computing or when monitoring the achievement of this intensive computing. Unified governance of a plurality of intensive computing solutions will benefit from the establishment of an aggregated interface capable of transmitting a received data to all the concerned services and/or capable of eliminating the data redundancy between the intensive computing solutions.

For that purpose, the inventors propose the use of a proxy microservice, positioned between an aggregated interface and computing microservices and configured to aggregate data so as in particular to eliminate the redundancy and, beyond that, to propose to the user clients new data derived from independent computing solutions.

Thus, the methods and systems developed by the inventors allow coupling ergonomics adapted to each new field and a centralization of the information.

The invention therefore relates to a method for generating an aggregated data accessible at an aggregated interface 10 of a user client 2.

Particularly, as illustrated in FIG. 1 and as will be described later, the method for generating an aggregated data and particularly the unified governance can be ensured by a computer system 1 for generating an aggregated data including: a proxy microservice 20 and at least one computing microservice 50, 51, 52, 53 for each of the intensive computing solutions.

The generation of an aggregated data will allow, thanks to the method according to the invention, centralizing data coming from a plurality of intensive computing solutions for which the user client has a subscription.

Indeed, a method 200 for generating an aggregated data according to the invention is advantageously implemented within the framework of unified governance of a plurality of intensive computing solutions 70. The intensive computing solutions 70 within the framework of the present invention are for example selected among: a high performance computing server 71, a server dedicated to supervised or unsupervised learning 72, and a server dedicated to quantum computing 73, particularly to quantum computing simulations. Particularly, a server dedicated to supervised or unsupervised learning 72 can be a server dedicated to supervised or unsupervised deep learning. Preferably, the intensive computing solutions include at least two of the solutions listed above, more preferably at least three of the solutions listed above. Even more preferably, the intensive computing solutions include a high performance computing server 71 and a server dedicated to quantum computing 73, particularly to quantum computing simulations.

Furthermore, the aggregated interface 10 is advantageously composed of a plurality of portlets 11, 12, 13, each portlet being able to be associated with an intensive computing solution 71, 72, 73.

The computing microservices 50 within the framework of the present invention are for example selected among: a microservice 51 linked to a high performance computing server 71, a microservice 52 linked to a server dedicated to supervised or unsupervised learning 72 and a microservice 53 linked to a server dedicated to quantum computing 73, particularly to quantum computing simulations.

Figure 2:
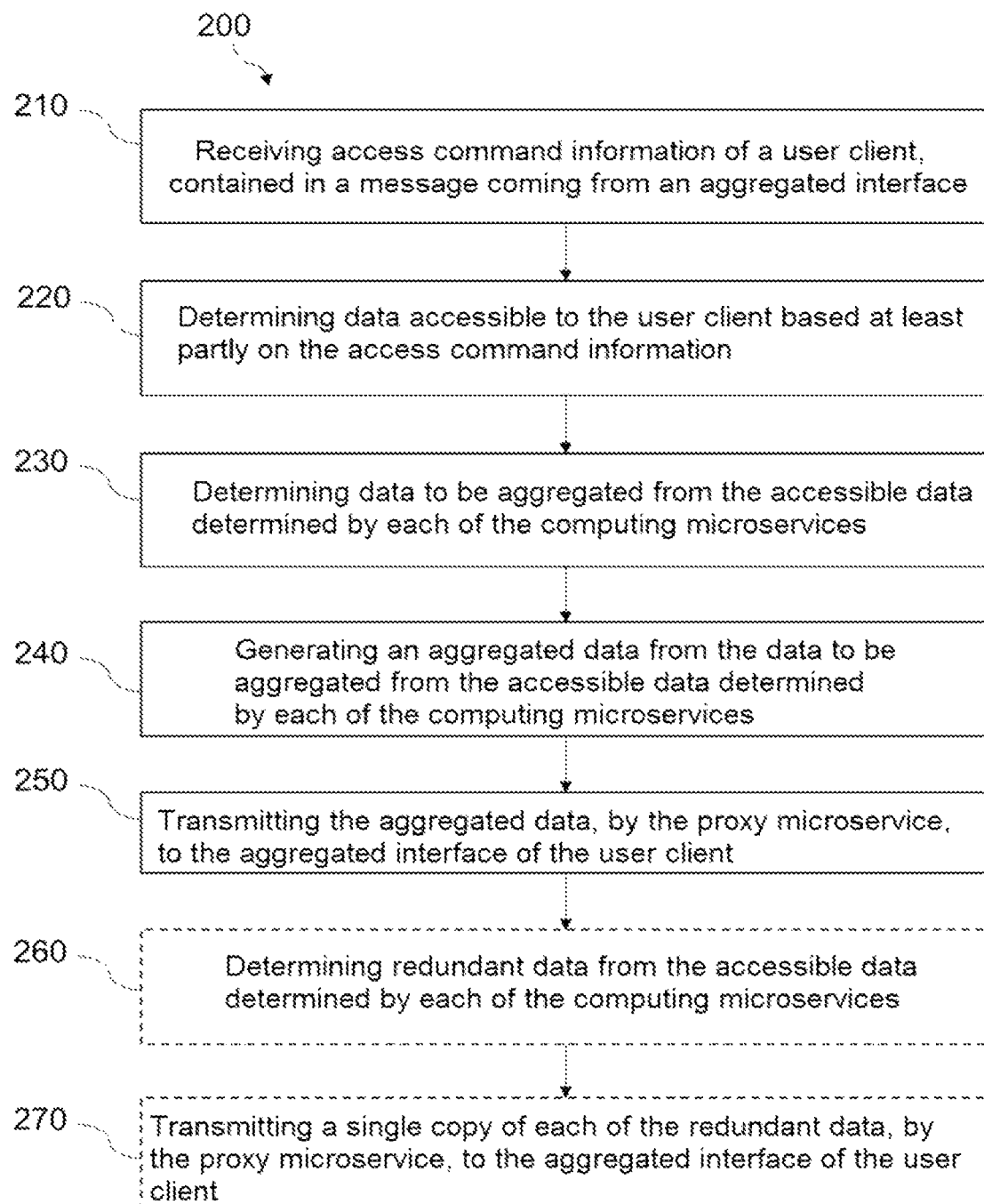
FIG. 2 represents a schematic illustration of a method for generating an aggregated data according to the invention.

As illustrated in FIG. 2, a method 200 for generating an aggregated data according to the invention includes the steps of receiving 210 access command information of a user client, determining 220 data accessible to the user client 2, determining 230 data to be aggregated, generating 240 an aggregated data from the data to be aggregated and transmitting 250 the aggregated data to the aggregated interface 10 of the user client 2.

Furthermore, a method 200 for generating an aggregated data according to the invention can include steps of determining 260 redundant data from the accessible data determined by each of the computing and transmission 270 microservices of a single copy of each of the redundant data, by the proxy microservice, to the aggregated interface 10 of the user client 2.

Furthermore, as will be detailed below, the method for generating an aggregated data according to the invention can advantageously integrate a procedure 300 for managing an action command generated by the user client 2 and a procedure 100 for managing an authorization.

Furthermore, the method for generating an aggregated data according to the invention can advantageously integrate steps of submitting jobs, monitoring the jobs, suspending and resuming the jobs and modifying the parameters of the jobs.

Advantageously, a method 200 for generating an aggregated data according to the invention can include a step of modifying the aggregated interface as a function of the authorizations granted to the user client. Indeed, once identified, the user client will be able to benefit from new functionalities and therefore from an aggregated interface consistent with these functionalities.

Some embodiments of the different steps of a method according to the invention will now be described in detail in connection with FIG. 3.

A method 200 for generating an aggregated data according to the present invention includes a receipt 210 of access command information. Particularly, this step can correspond to the receipt of a message coming from an aggregated interface 10, and therefore from the user client 2.

Figure 3:
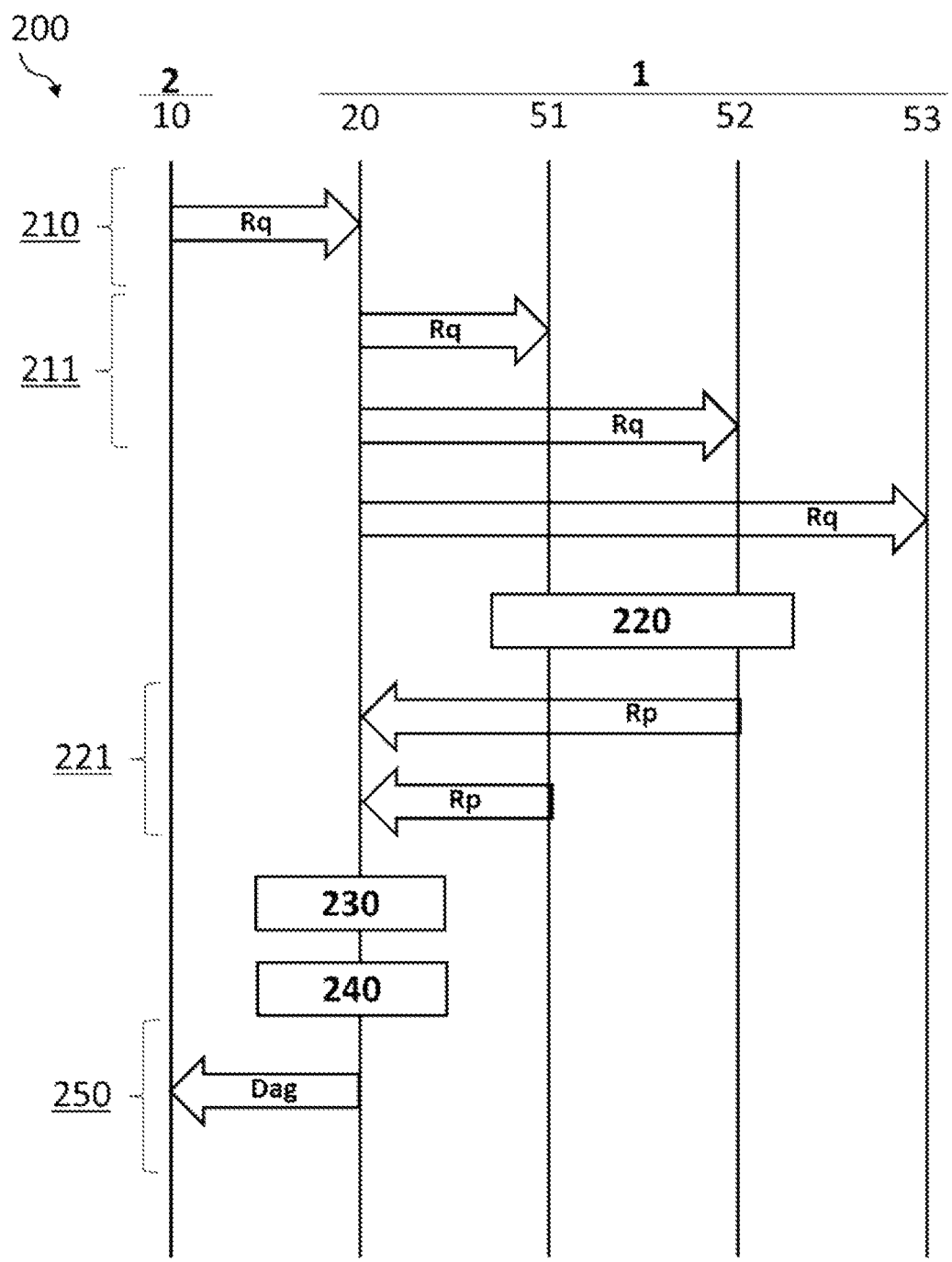
FIG. 3 represents a schematic illustration of a method for generating an aggregated data according to one embodiment of the invention.

As illustrated in FIG. 3, it is the proxy microservice 20 that will receive a message Rq coming from the user client 2 and generated via the aggregated interface 10. Indeed, preferably, at least part of the access command information is generated at the aggregated interface 10 of the user client 2.

The Rq message could also include identification data of the user client 2. This Rq message could be transmitted to the computing microservices 51, 52, 53.

Thus, the proxy microservice 20 can receive a request from an aggregated interface 10 running on a user client 2 and it can select one or several of the computing microservices 51, 52, 53 to operate on the request.

The proxy microservice 20 can provide the possibility of making 211 several parallel Rq requests to several targets (i.e. computing microservices 51, 52, 53) and extracting a common set of data from the outputs returned by the computing microservices 51, 52, 53.

The one or several of the computing microservices 51, 52, 53 can analyze the request and identify a data they have and for which an access is required.

Particularly, a method 200 for generating an aggregated data according to the present invention includes a determination 220 of data accessible to the user client 2.

Such a determination can be performed by each of the computing microservices 51, 52, 53. It is based at least partly on the access command information received by the proxy microservice 20.

There are many possible variants in the implementation of the determination 220 of data accessible to the user client 2. Advantageously, each of the computing microservices 51, 52, 53 includes a data memory capable of storing last values of a plurality of parameters relating to the intensive computing solution to which it is linked. Alternatively, the computing microservice can query a server hosting the intensive computing solution in order to obtain the last requested value.

Furthermore, a computing microservice 51, 52, 53 can occasionally record information provided by the server of the intensive computing solution on a logging library and store this information in a database. Alternatively, it is the proxy microservice 20 that can occasionally record information provided by the server of the intensive computing solution on a logging library and store this information in a database.

Furthermore, the determination of the accessible data can take into account an authentication 120 of the user client 2, for example via a token security microservice 30, particularly in connection with a security repository 35, 36, 37, and at least one authorization repository 40 as will be described below, in particular in connection with FIG. 5.

A possibly accessible data to be aggregated can for example be selected among:

Computing input files accessible and processable by several intensive computing solutions:

This allows the user client 2 to have a view aggregating the computing input files that are processable by all the intensive computing solutions and thus comprehend the entirety of his activity.

Computing results accessible and processable by several computing microservices:

This allows the user client 2 to have a view aggregating the computing results processed by all the intensive computing solutions and thus comprehend the entirety of the accessible results of his activity.

Energy consumption measurements of the intensive computing solutions:

This allows the user client 2 to have a data summarizing the expected or actual energy consumption of the intensive computing planned and thus comprehend the entirety of the consumption of his activity.

Resource use measurements (network bandwidth, storage inputs-outputs, memory, CPU, GPU . . . ):

Thus, instead of having data scattered within the different intensive computing solutions, the user client 2 receives an aggregated data of the use of the resources associated with its intensive computing.

System parameters:

Thus, the user client 2 receives an aggregated data of the system parameters of the intensive computing solutions used.

Descriptions of the hardware infrastructures:

Thus, the user client 2 receives an aggregated data of the descriptions of the hardware infrastructures of the intensive computing solutions used.

Use index data for the intensive computing processes:

Beyond the resource use measurement, it is advantageous to be able to receive a use index value for the intensive computing processes aggregating data coming from the different computing solutions used. For example, this index value can be calculated from the use durations as well as the capacities used. This use index value for the intensive computing processes can for example be then used to calculate a use cost of the intensive computing processes and establish a common billing.

Duration data before completion of the computing:

For example, if a problem is divided between several intensive computing solutions, then an aggregated time is proposed reflecting the end of the operations for each of the servers and making it possible to obtain the full expected results.

Preferably, the aggregated data is selected among:
Computing results accessible and processable by several computing microservices;
Energy consumption measurements of the intensive computing solutions;
Resource use measurements;
Use index data for the intensive computing processes; and
Duration data before completion of the computing.

More preferably, the aggregated data is selected among:
Computing results accessible and processable by several computing microservices;
Energy consumption measurements; and
Resource use measurements.

More preferably, the aggregated data corresponds to use index data for the intensive computing processes.

Once the determination 220 of data accessible to the user client 2 has been performed, the microservices having identified an accessible data will be able to send 221 the data to the proxy microservice 20 in a response message Rp.

As illustrated in FIG. 3, a method 200 for generating an aggregated data according to the present invention includes a determination 230 of data to be aggregated.

Preferably, the determination 230 is performed by the proxy microservice 20. The determination 230 of data to be aggregated is for example performed from the accessible data determined by each of the computing microservices 51, 52, 53.

The computing microservices 51, 52, 53 can be invoked with messages of the parallel proxy microservice 20 and the information contained in the response messages Rp can be aggregated (subject to configurable timeouts) as the results return to the proxy microservice 20.

Particularly, the determination 230 of data to be aggregated can implement a keyword repository 21 including correspondences of the categories of accessible data for each of the computing microservices 51, 52, 53.

A method 200 for generating an aggregated data according to the present invention includes a generation 240 of an aggregated data from the data to be aggregated. Particularly, this aggregated data is a new data generated from several data each directly or indirectly coming from different intensive computing solutions 71, 72, 73 and not being configured to work together.

This aggregated data is therefore new and allows the user client 2 to inform about a global activity of intensive computing distributed among several independent services.

The proxy microservice 20 can merge and format the output data as needed.

A method 200 for generating an aggregated data Dag according to the present invention then includes a transmission 250 of said aggregated data.

As illustrated in FIG. 3, this transmission is preferably performed by the proxy microservice 20 intended for the aggregated interface 10 of the user client 2.

Alternatively, the aggregated data can be transmitted to other microservices such as for example:
a remote visualization server 80, preferably a 3D remote visualization server, and
a management microservice 55.

Advantageously, the aggregated data is transmitted to a remote visualization server 80, and the method according to the invention further includes a step of establishing a communication, preferably secure (e.g. encryption) link, between the user client 2 and the remote visualization server 80, a step of generating representation data from the data aggregated by the remote visualization server 80 and a step of transmitting, by the visualization server 80, the representation data to the user client 2.

A method for generating aggregated data can also be used within the framework of the invention to manage the data redundancy.

Indeed, within the framework of the unified governance of a plurality of intensive computing solutions 70, a removal of the data redundancy, particularly at an aggregated interface 10 can allow smoothing the transfer of information and limiting the errors.

Thus, a method according to the invention can advantageously further include a determination 260 of redundant data. This step can be carried out for example by the proxy microservice 20 and from the accessible data determined by each of the computing microservices. Furthermore, it can include a step of transmitting 270 a single copy of each of the redundant data, by the proxy microservice 20, to the aggregated interface of the user client 2.

Alternatively, the accessible data are transmitted by the proxy microservice 20 to the aggregated interface of the user client 2 and it is the aggregated interface 10 that determines the redundant data.

A method for managing an aggregated data can also include an action command management procedure 300. Within the framework of this action command management procedure 300, the computer system 1 for generating an aggregated data can further include a token security microservice 30, at least one security repository 35, 36, 37 and at least one authorization repository 40.

Figure 4:
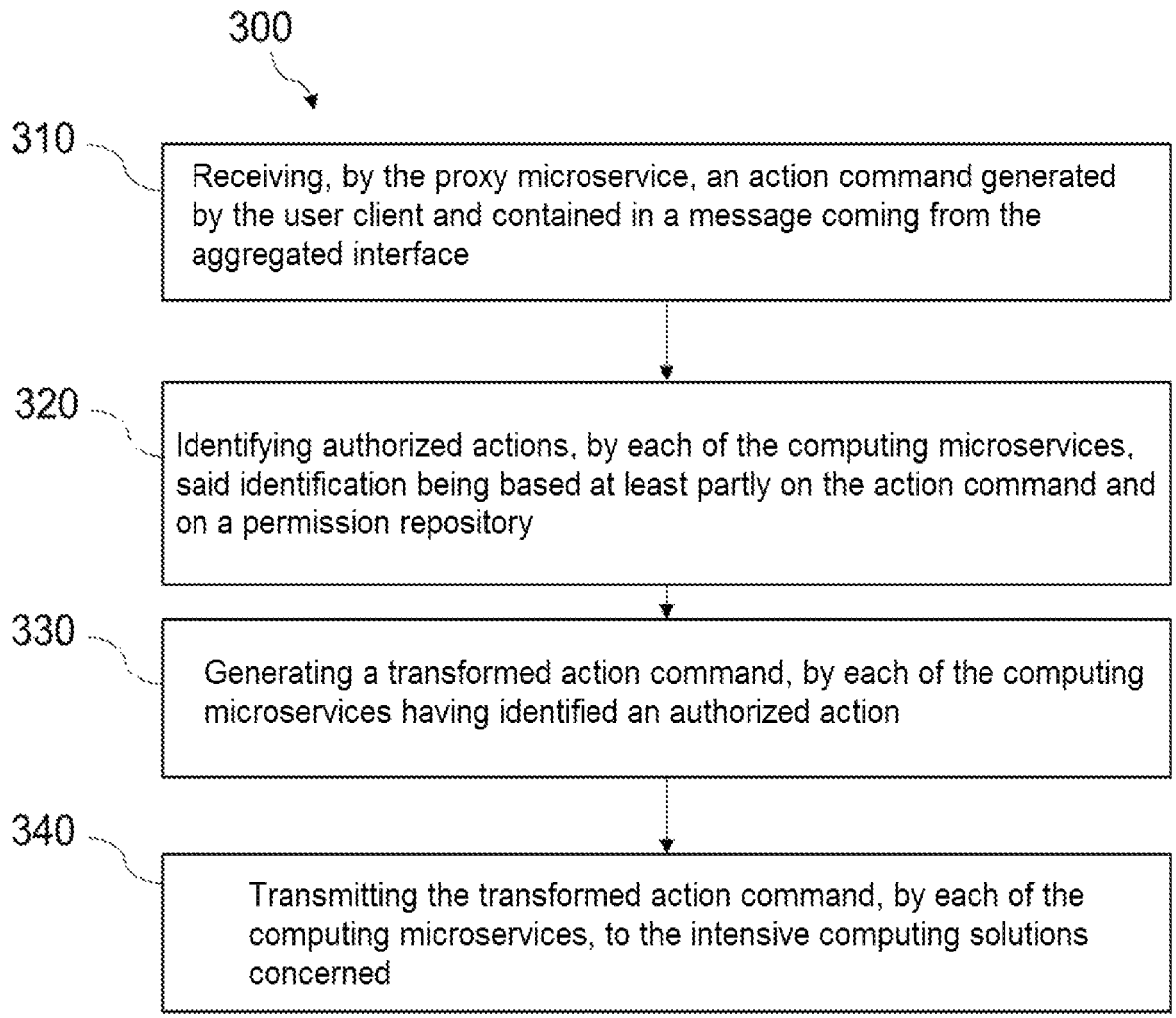
FIG. 4 represents a schematic illustration of an action command management procedure according to one embodiment of the invention.

As illustrated in FIG. 4, an action command management procedure 300 can include a receipt 310, by the proxy microservice 20, of an action command generated by the user client 2. This action command can for example be contained in a message coming from the aggregated interface 10.

The procedure 300 can also include an identification 320 of actions authorized by each of the computing microservices 50, 51, 52, 53. This identification is preferably based at least partly on the action command and on an authorization repository 40 which will be described below. Thus, from a message issued by an aggregated interface 10 and including an action command, the computing microservices can, thanks to the authorization repository 40, determine whether this action command refers to one or several actions authorized for a given user client 2.

The procedure 300 also includes a generation 330 of a transformed action command, by each of the computing microservices 50, 51, 52, 53 having identified an authorized action. Indeed, while the action command generated by the aggregated interface has taken a form that can be addressed by all the computing microservices thanks for example to a common keyword repository, the computing microservices can secondly generate a transformed action command which can be addressed by the intensive computing solutions. Since these solutions are independent, the transformed action commands will generally be different depending on the computing microservices.

The procedure 300 can also include a transmission 340 of the transformed action command, by each of the computing microservices 50, 51, 52, 53, to the intensive computing solutions 70 concerned.

A method for generating aggregated data can also include a procedure 100 for managing authorizations granted to a user client 2. Within the framework of this authorization management procedure 100, the computer system 1 for generating an aggregated data can further include a token security microservice 30, at least one security repository 35, 36, 37 and at least one authorization repository 40.

Figure 5:
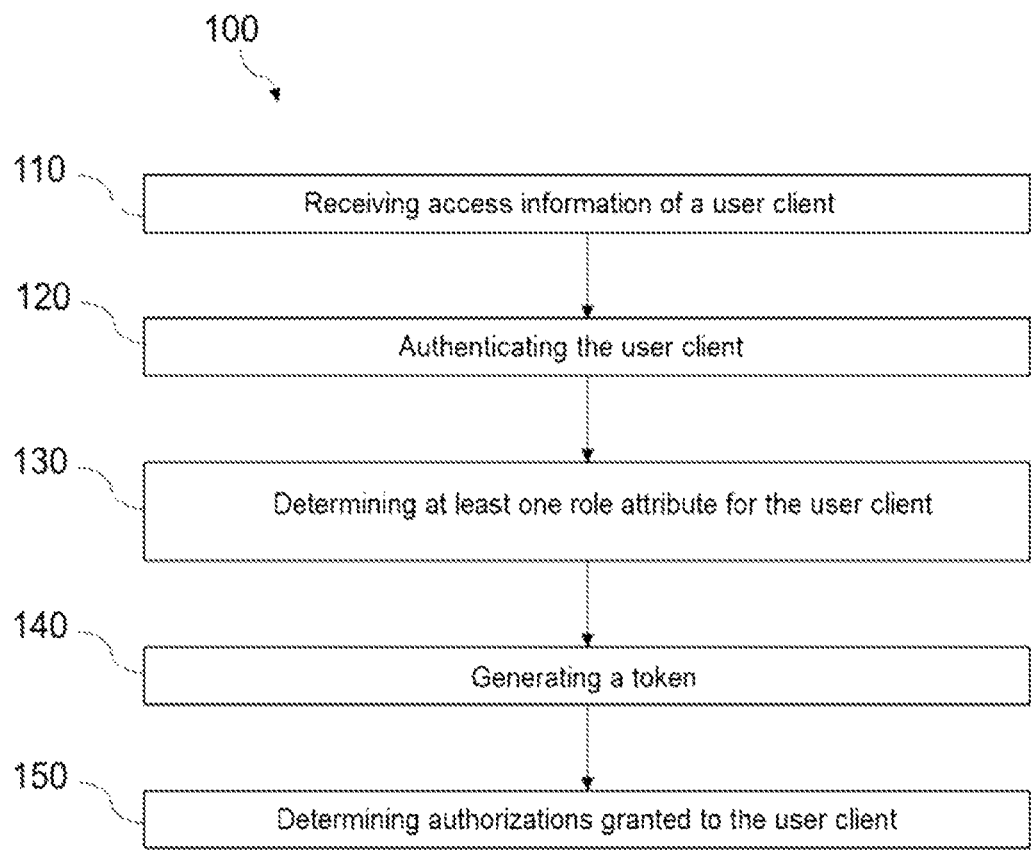
FIG. 5 represents a schematic illustration of an authorization management procedure according to one embodiment of the invention.

As illustrated in FIG. 5, an authorization management procedure 100 according to the invention includes the steps of receiving 110 access information of a user client 2, authenticating 120 the user client 2, determining 130 at least one role attribute for the user client 2, generating 140 a token and determining 150 authorizations granted to the user client 2.

Furthermore, an authorization management procedure 100 according to the invention can include steps of submitting jobs, monitoring jobs, suspending and resuming jobs and modifying the parameters of the job.

Advantageously, a management method 100 according to the invention can include a step of modifying the aggregated interface as a function of authorizations granted to the user client. Indeed, once identified, the user client will be able to benefit from new functionalities and therefore from an aggregated interface consistent with these functionalities.

Thus, the authorization management procedure 100 according to the present invention includes a receipt 110 of access information of a user client 2.

Preferably, at least part of the access information is generated at the aggregated interface 10 of the user client 2.

Particularly, the receipt can be made by the token security microservice 30. However, preferably, this information is transferred from the user client directly or indirectly to the proxy microservice 20, then the proxy microservice 20 then transfers this access information, modified or not, to the token security microservice 30.

The access information can for example take the form of a message coming from the user client including identification data of the user client 2.

Thus, the authorization management procedure 100 according to the present invention includes an authentication 120 of the user client 2.

The authentication can for example be performed by any module capable of implementing a single Sign On (SSO) protocol. Different protocols can be used to perform the authentication of the user client 2. Preferably, the authentication 130 of the user client 2 is done according to a protocol selected among a known protocol OAuth allowing a third-party application to access a Web service, and SAML (Security assertion marKup language) concerning a computer standard defining a protocol for exchanging information related to security and allowing the single Sign On of a user.

Advantageously, the authentication 120 of the user client 2 is not performed by the proxy microservice 20. More preferably, the authentication is performed by a token security microservice 30. There is thus a delegation, by the proxy microservice 20, from the identification, authentication and role assignment control to the token security microservice 30.

Particularly, the token security microservice 30 is configured to access a plurality of directories or security repositories 35, 36, 37, preferably at least LDAP (Lightweight Directory Access Protocol) type directories, a service for storing and managing an information system such as the known solution Active Directory® and an authentication system such as the known authentication protocol Kerberos®. The security repository 35, 36, 37 can correspond to a medium for storing keys and/or tokens, such as a database, a data file or any other system for a secure storage in a memory. It is generally a secure medium for storing the names, passwords, roles and authorizations of the users. Preferably, it includes a role matrix and a subscription matrix.

Furthermore, the token security microservice 30 advantageously implements an OAuth-type and particularly OAuth 2.0-type protocol.

Preferably, although the token security microservice 30 forms part of a computer system 1 for generating an aggregated data according to the invention, it is advantageously hosted on one or several different computer devices (e.g. servers), distinct from the computer device(s) hosting the proxy microservice 20 and/or the computing microservices 50, 51, 52, 53.

There are many possible variants in the implementation of the authentication 130 of the user client 2. Advantageously, the token security microservice 30 can provide a very wide variety of authentication protocol but is not able to provide optimized fine-grained security controls. To overcome this situation, the inventors have proposed a delegation of only a control subset to the token security microservice 30. If the token security microservice 30 cannot provide sufficiently fine security controls for intensive computing solutions, these controls will be entrusted to the computing microservices.

Furthermore, the proxy microservice can record information provided by the user client on a logging library and store this information in a database.

The authentication 130 of the user client 2 can also correspond to an authentication of a developer client. Advantageously, the token security microservice 30 will be invoked each time a third-party contacts the proxy microservice and requires an authentication.

Thus, the authorization management procedure 100 according to the present invention includes a determination 130 of at least one role attribute for the user client 2.

Preferably, the determination 130 is performed by the token security microservice 30. The determination 130 of at least one role attribute for the user client 2 is for example performed from the access command information and data stored in a security repository 35.

Once the user client has been authenticated, the method according to the invention will allow the generation of a token allowing a temporary access to resources managed by the computing microservices. Particularly, the method according to the invention is based on authorizations controlled via previously determined roles or role attributes.

Based on predetermined rules, a role is selected for a user client 2 and registered in an identification token of the user client.

The token can for example take the form of a JWT token (JSON Web Token). It contains the requests on the identity of the authenticated user client. Alternatively, the method according to the invention can implement a PASETO (Platform-Agnostic Security Tokens) type token, a Branca-type token or even a Macaroons-type token (Cookies with contextual warnings for the decentralized authorization in the cloud according to Google®).

Preferably, the authentication 120 and the determination 130 of at least one role attribute for the user client 2 are performed in accordance with the OAuth 2.0 protocol.

Particularly, the token security microservice 30 processes a message from the proxy microservice 20 and extracts the access request. The token security microservice 30 then compiles the list of the access rights granted for the user client 2 and requests a security token for the granted rights.

A token is then generated and transmitted to the proxy microservice 20 which in turn transmits it to the user client.

Thus, the authorization management procedure 100 according to the present invention includes a generation 140 of a token. Particularly, this generated token allows an access to all the intensive computing solutions accessible (i.e. for which the user client has the authorizations) to said user client 2 based on the at least one determined role attribute.

However, this token does not generally allow finely defining the authorizations granted to the user client 2 for on one or several intensive computing solutions. More preferably, the generated token includes access rights to one or several intensive computing solutions as well as a role characteristic of the user client 2.

Thus, the authorization management procedure 100 according to the present invention then includes a determination 150 of authorizations granted to the user client 2.

Advantageously, the authorization determination is based on the at least one determined role attribute and data contained in an authorization repository 40.

The authorization determination 150 can for example be performed by the proxy microservice or a computing microservice.

Preferably, the authorization determination 150 is performed by at least one computing microservice 50, 51, 52, 53.

For example, an intensive computing solution can have more than 50 functionalities that need to be multiplied by a distribution based on the user's roles and on the solutions. Thus, it is generally several hundred authorizations that must be managed. Within the framework of the invention, a computing microservice is therefore advantageously coupled with an authorization catalog or an authorization repository 40.

This authorization catalog or repository 40 can be implemented as a table in the database of the backend (either in its own microservice or in a dedicated microservice).

Thus, at least part of the access control and authorization management is implemented at each of the computing microservices.

Thanks to this, it will be possible to meet the very fine-grained authorization needs of the intensive computing solutions while ensuring a high level of security provided by the use of authentication tokens.

There are planners or schedulers making it possible, within a set of reserved resources, to distribute the computing tasks between the computing means and to order them. However, these methods and devices only intervene once the computing means have been allocated and do not allow an operator to quickly identify the nodes to be allocated.

Thus, the method according to the invention can also include a task planning step. Indeed, the method according to the invention applies to unified governance of a plurality of intensive computing solutions and it can advantageously include a step during which instructions received by the proxy microservice 20 can be processed so as to organize their optimal execution by the different intensive computing solutions available.

Preferably, the task planning step includes a queue update by each of the computing microservices 50, 51, 52, 53. Particularly, the queue update can take into account a priority index value transmitted by the user client 2.

The task planning step can also include the determination by at least one computing microservice of an amount of resources of a computing solution which will be assigned to a given task.

Furthermore, the task planning step can include the transmission of parameterization data to the intensive computing solution in charge of executing a given task. The parameterization data could for example correspond to one or several input files, or even to a setting specific to the intensive computing solution.

Preferably, the task planning step can also include, during the initiation of a task, the transmission of environment parameterization data such as identifiers of the job directories to be used, the data access paths or the libraries to be used.

Furthermore, the planning step can include:
  a monitoring of the tasks (i.e. jobs) including the determination of the progress of the jobs, the recording of application logs, the recording of result files, the determination of amounts of resources used, the determination of a used credit value,
  a conclusion or suspension of the jobs,
  a resumption of the suspended jobs,
  a modification of the parameters of the jobs.

Preferably, the method according to the invention can include an automated segmentation of a task into a plurality of subtasks assigned to several different intensive computing solutions. Alternatively, a user can, via the aggregated interface, define the distribution of sub-tasks of the same project through several intensive computing solutions. These sub-tasks can be executed in series or in parallel depending on their specificities.

According to another aspect, the invention relates to a computer system 1 for generating an aggregated data accessible at an aggregated interface 10 of a user client 2 within the framework of unified governance of a plurality of intensive computing solutions 70.

Particularly, a computer system 1 for generating an aggregated data according to the invention includes a proxy microservice 20 and at least one computing microservice 50, 51, 52, 53 for each of the intensive computing solutions.

Figure 6:
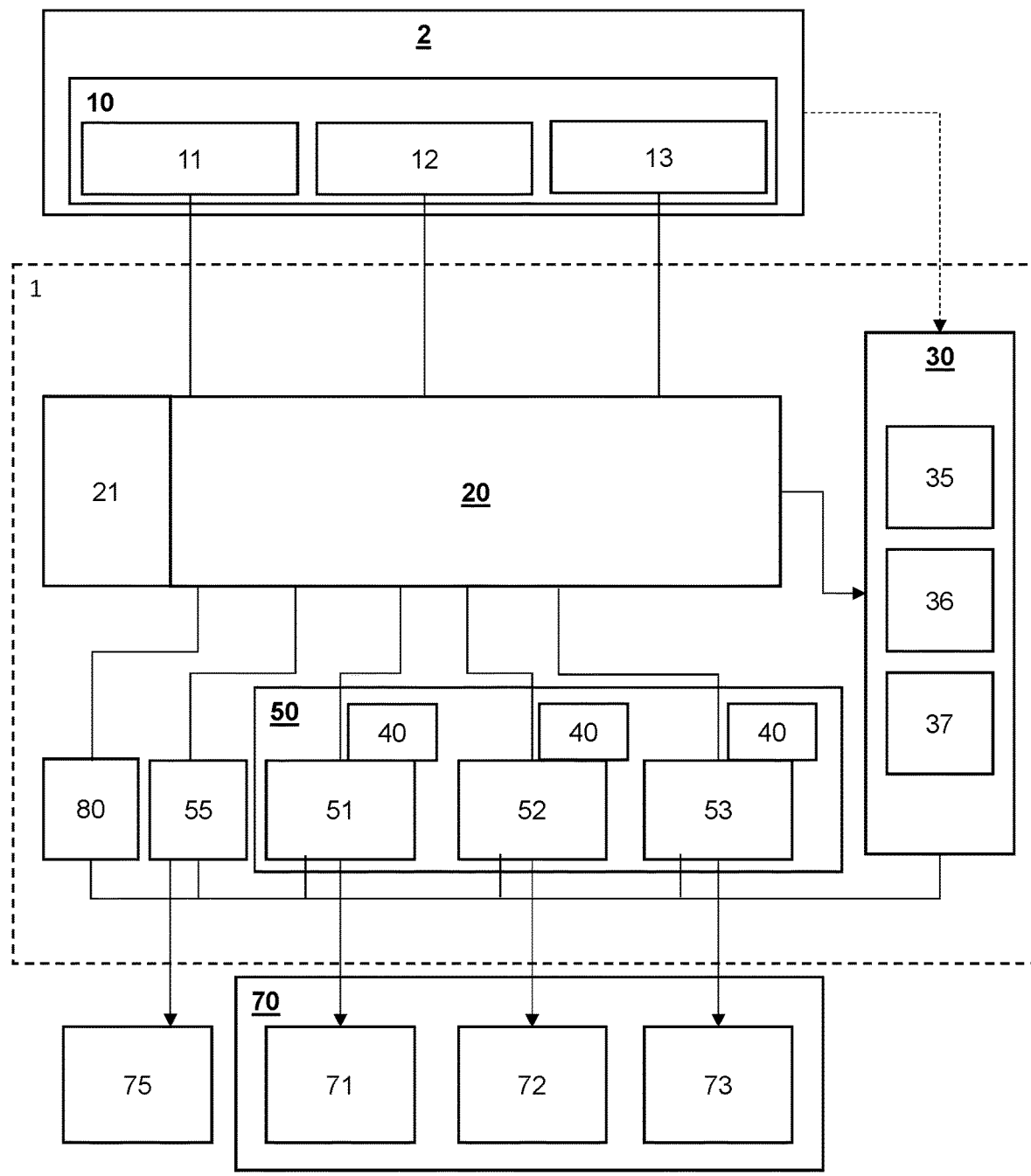
FIG. 6 represents a diagram of a computer system for generating an aggregated data according to one embodiment of the invention.

Furthermore, an exemplary schematic diagram of the system 1 is presented in FIG. 6. Such a computer system 1 for generating an aggregated data according to the invention can also include: a token security microservice 30, at least one security repository 35, 36, 37, an authorization repository 40 and a remote visualization server 80, preferably a 3D remote visualization server.

Considering the implementation of the system according to the invention, the latter can be hosted by one or several computer servers. It includes particularly a set of microservices such as microservices implemented according to coding protocols of the node.js type or other technologies such as Go, Java/Kotlin/Scala, PHP, Python, Pharo, Elixir, Clojure and Haskell.

The microservices can use configuration entities, such as Json files or XML files or similar representations, as inputs to provide the basic components of the logic, of the transformations, of the mapping and of the management of the keys of the system 1.

Each of the services or solutions (token security service, management service, intensive computing solutions) accessible via the proxy microservice 20 can be supported by a corresponding microservice or a chain of microservices providing the logic of implementation of the provided service. Within the framework of the method according to the invention, the microservices can be executed individually and separately in a security zone as microservice(s).

Particularly, a computer system 1 for generating an aggregated data according to the invention includes a proxy microservice 20, configured to receive a message coming from an aggregated interface. Particularly, the message coming from the aggregated interface can include access command information of a user client 2. This access command information can correspond to parameters for which the user client requests a value or to data that the user client wishes to receive. The message coming from the aggregated interface can further include identifier data of the user client.

The proxy microservice 20 is also configured to determine data to be aggregated from the accessible data. The determination of the accessible data is preferably performed by the computing microservices, for example via the selection of data stored on a data memory accessible to the computing microservice. The determination of the data to be aggregated could for example be based on data stored on a data memory accessible to the proxy microservice 20.

The proxy microservice 20 is also configured to generate an aggregated data from the data to be aggregated. This generation can for example be based on predetermined computing formulas stored on a data memory accessible to the proxy microservice 20. For example, based on the accessible data and on an aggregation repository including predetermined computing formulas, the proxy microservice 20 will generate an aggregated data.

The proxy microservice 20 is also configured to transmit the aggregated data to the aggregated interface 10 of the user client 2.

Furthermore, the proxy microservice 20 can be configured to receive access information of a user client 2. The proxy microservice 20 can be coupled to an add-on that allows taking into account the authorization policies specific to each microservice (business logics), thus allowing a standardization of the exchanges between the proxy microservice 20 and the token security microservice 30. Particularly, this can be used to synchronize user attributes (potentially of very different nature therebetween) in correspondence with the roles specific to the business logics/microservices.

The proxy microservice 20 is advantageously configured to route the incoming requests towards the appropriate microservice as a function of the specified endpoint, of the logic and/or of the arguments.

The computer system 1 for generating an aggregated data according to the invention includes at least one computing microservice 50, 51, 52, 53 for each of the intensive computing solutions 70, 71, 72, 73. Each of the computing microservices 50, 51, 52, 53 can be linked to its respective intensive computing solution in secure channels such as ssh (secure shell) or Mosh (mobile shell) connections.

Preferably, the computing microservices 50, 51, 52, 53 are configured to determine data accessible to the user client 2. This determination is made particularly from access command information.

Furthermore, each of the computing microservices 50, 51, 52, 53, can be configured to determine authorizations granted to the user client 2. Indeed, once a role attribute has been determined, it can be transferred to a microservice which can determine, based on the role attribute value and on the data contained in an authorization repository 40, authorizations granted to the user client 2.

Particularly, the computing microservices 50, 51, 52, 53 coupled to the proxy microservice 20 can be configured to point towards (or be linked) respectively to a particular service or to a particular server. Thus, when a computing microservice is called, a corresponding intensive computing service is selected.

Particularly, a computer system 1 for generating an aggregated data according to the invention includes a token security microservice 30, configured to receive the access information of a user client 2, to authenticate the user client 2 and to determine at least a role attribute for the user client 2 from the access information and data stored in a security repository 35, 36, 37.

Preferably, the token security microservice 30 is further configured to generate a token, said token allowing an access to all the intensive computing solutions accessible to said user client 2 based on the at least one determined role attribute.

Preferably, although the token security microservice 30 forms part of a management computer system 1 according to the invention, it is advantageously hosted on one or several computer devices (e.g. servers) different from the computer device(s) hosting the proxy microservice 20 and/or the computing microservices 50, 51, 52, 53.

The token security microservice 30 can be configured to route the incoming requests towards the appropriate service as a function of the specified endpoint, of the logic and/or of the arguments.

Particularly, the token security microservice 30 coupled to the proxy microservice 20 can be configured to point towards (or be linked to) a particular service or server. The token security microservice 30 can be configured to access a plurality of directories, preferably at least LDAP type directories 35, Active Directory® 36 and Kerberos® 37.

Furthermore, the token security microservice 30 can advantageously be configured so as to be able to assign shared roles or specific roles, preferably it is configured so as to be able to assign a role shared by all the computing microservices 50, 51, 52, 53.

Furthermore, a computer system 1 for generating an aggregated data according to the invention can also include a management microservice 55. Such a management microservice could be connected to the computing microservices 50, 51, 52, 53, to the proxy microservice and to the token security microservice. In addition, this management microservice can be configured to distribute the computing tasks between the computing means and to order them. Particularly, it can be configured to organize the optimal execution of the tasks by the different intensive computing solutions available.

Furthermore, the system 1 for generating an aggregated data according to the invention can also include a remote visualization server 80, preferably a 3D remote visualization server.

Such a remote visualization server 80 allows user clients 2 to execute interactive 2D/3D graphics applications on remote servers instead of their system, and to open visualization sessions to control them remotely. Thus, all of the computing and rendering of the graphics applications, including the 3D rendering, is carried out on the server side on dedicated resources. The keyboard and mouse inputs from the user client 2 are transferred to the server which, in return, encodes the graphics scene in pixels and returns the data in the form of video stream to the user client 2. The user client 2 is then only responsible for the rendering of the 2D video stream. Such a server allows working only on remote data without having to transfer it over the network. Generally indeed, the computing result files can be very large (from gigabytes to terabytes) and cannot be transferred efficiently via Internet or corporate private networks. Furthermore, such a remote visualization associated with the management of the authorizations according to the invention allows increasing the security of the technology.

What is claimed is:

1. A method for generating an aggregated data accessible at an aggregated interface of a user client within a framework of unified governance of a plurality of intensive computing solutions,
wherein said plurality of intensive computing solutions includes at least two solutions selected from a high performance computing server, a server dedicated to supervised or unsupervised learning, and a server dedicated to quantum computing;
wherein the unified governance is ensured at least partly by a computer system for generating the aggregated data comprising
a proxy microservice, and
computing microservices comprising at least one computing microservice for each of the plurality of intensive computing solutions;
said method comprising:
receiving, by the proxy microservice, access command information of the user client, contained in a message coming from the aggregated interface,
determining accessible data comprising data accessible to the user client, by each of the computing microservices, said determining accessible data being based at least partly on the access command information transmitted by the aggregate interface of the user client,
determining data to be aggregated, by the proxy microservice, from the accessible data determined by each of the computing microservices, said data to be aggregated comprising a sub-part of the accessible data,
generating an aggregated data from the data to be aggregated, by the proxy microservice, from the accessible data determined by each of the computing microservices, and
transmitting the aggregated data, by the proxy microservice, to the aggregated interface of the user client;
wherein the proxy microservice is configured to make several parallel requests to several of said computing microservices and to extract a common set of data from outputs returned by the computing microservices;
wherein the computer system for generating an aggregated data further includes at least one authorization repository, and the method further comprises
receiving, by the proxy microservice, an action command generated by the user client and contained in a second message coming from the aggregated interface;
identifying authorized actions, by each of the computing microservices, wherein said identifying authorized actions is based at least on
the action command, and
the at least one authorization repository;
generating a transformed action command, by each of the computing microservices having identified an authorized action; and
transmitting the transformed action command, by each of the computing microservices to the plurality of intensive computing solutions concerned.

2. The method for generating an aggregated data according to claim 1, wherein the proxy microservice receive a request from said aggregated interface running on the user client and is configured to select one or several of the computing microservices to operate on the request.

3. The method for generating an aggregated data according to claim 1, wherein the determining of the accessible data takes into account an authentication of the user client, via a token security microservice, in connection with a security repository, and the at least one authorization repository.

4. The method for generating an aggregated data according to claim 1, wherein the determining of data to be aggregated implements a keyword repository including correspondences between the accessible data for each of the computing microservices.

5. The method for generating an aggregated data according to claim 1, wherein the computing microservices can be invoked with messages of the proxy microservice and information contained in response messages of the outputs is aggregated as results returned to the proxy microservice.

6. The method for generating an aggregated data according to claim 1, further comprising:
determining redundant data, by the proxy microservice, from the accessible data determined by each of the computing microservices, and
transmitting a single copy of each of the redundant data, by the proxy microservice, to the aggregated interface of the user client.

7. The method for generating an aggregated data according to claim 1, further comprising:
transmitting the accessible data, by the proxy microservice, to the aggregated interface of the user client; and
determining redundant data, by the aggregated interface, from the accessible data transmitted by the proxy microservice,
displaying, by the aggregated interface, a single copy of each of the redundant data.

8. The method for generating an aggregated data according to claim 1, wherein the aggregated data is transmitted to a remote visualization server, and the method further includes a step of establishing a communication between the user client and the remote visualization server, a step of generating representation data from the data aggregated by the remote visualization server, and a step of transmitting, by the remote visualization server, the representation data to the user client.

9. The method for generating an aggregated data according to claim 1, further comprising an action command management procedure, and wherein within the framework of this action command management procedure the computer system for generating the aggregated data is further configured to include a token security microservice, at least one security repository and the at least one authorization repository.

10. The method for generating an aggregated data according to claim 9, wherein the action command management procedure includes an identification of actions authorized by each of the computing microservices based at least partly on the action command generated by the user client and on an authorization repository, and wherein the computing microservices are configured, via the authorization repository, to determine whether this action command refers to one or several actions authorized for a given user client.

11. The method for generating an aggregated data according to claim 1, wherein the aggregated data is selected among:
computing input files accessible and processable by several intensive computing solutions of the plurality of intensive computing solutions;
computing results accessible and processable by several said computing microservices;
energy consumption measurements;
resource use measurements;
system parameters;
descriptions of hardware infrastructures;
use index data for intensive computing processes; and duration data before completion of the intensive computing processes.

12. The method for generating an aggregated data according to claim 1, wherein the aggregated data is selected among:
computing results accessible and processable by several said computing microservices;
energy consumption measurements; and
resource use measurements.

13. The method for generating an aggregated data according to claim 1, wherein the computer system for generating the aggregated data further includes a token security microservice and at least one security repository, said method further comprising a procedure for managing authorizations granted to the user client comprising:
receiving, by the token security microservice, access information of said user client,
authenticating the user client and determining, by the token security microservice, at least one role attribute for the user client from the access command information and data stored in the at least one security repository,
generating a token, by the token security microservice, said token allowing an access to all of the plurality of intensive computing solutions accessible to said user client based on the at least one role attribute, and
determining the authorizations granted to the user client, by the at least one computing microservice, said determining the authorizations being based on the at least one role attribute and data contained in the at least one authorization repository.

14. The method for generating an aggregated data according to claim 13, wherein the access information of the user client comes from the message sent from the aggregated interface of the user client to the proxy microservice.

15. The method for generating an aggregated data according to claim 14, wherein the message sent from the aggregated interface of the user client includes identification data of the user client.

16. A computer system for generating an aggregated data accessible at an aggregated interface of a user client within a framework of unified governance of a plurality of intensive computing solutions, said plurality of intensive computing solutions including at least two solutions among: a high performance computing server, a server dedicated to supervised or unsupervised learning and a server dedicated to quantum computing, the unified governance being ensured at least partly by the computer system for generating the aggregated data, said computer system comprising:
computing microservices comprising at least one computing microservice for each of the plurality of intensive computing solutions,
wherein the at least one computing microservice being configured to determine accessible data comprising data accessible to the user client, said determine being based at least partly on access command information;
a proxy microservice configured to
receive a message coming from the aggregated interface, said message including said access command information of the user client,
determine data to be aggregated from the accessible data determined by each of the computing microservices,
generate an aggregated data from the data to be aggregated from the accessible data determined by each of the computing microservices, and
transmit the aggregated data to the aggregated interface of the user client;
wherein the proxy microservice is further configured to make several parallel requests to several of said computing microservices and to extract a common set of data from outputs returned by the computing microservices; and,
at least one authorization repository;
wherein the proxy microservice is further configured to receive an action command generated by the user client and contained in a second message coming from the aggregated interface;
wherein each of the computing microservices of the at least one computing microservice is further configured to
identify authorized actions, wherein said identify said authorized actions is based at least on
the action command, and
the at least one authorization repository;
generate a transformed action command having identified an authorized action; and
transmit the transformed action command to the plurality of intensive computing solutions concerned.

17. A method for generating an aggregated data accessible at an aggregated interface of a user client within a framework of unified governance of a plurality of intensive computing solutions,
wherein said plurality of intensive computing solutions includes at least two solutions selected from a high performance computing server, a server dedicated to supervised or unsupervised learning, and a server dedicated to quantum computing;
wherein the unified governance is ensured at least partly by a computer system for generating the aggregated data comprising
a proxy microservice, and
computing microservices comprising at least one computing microservice for each of the plurality of intensive computing solutions;
said method comprising:
receiving, by the proxy microservice, access command information of the user client, contained in a message coming from the aggregated interface,
determining accessible data comprising data accessible to the user client, by each of the computing microservices, said determining accessible data being based at least partly on the access command information transmitted by the aggregate interface of the user client,
determining data to be aggregated, by the proxy microservice, from the accessible data determined by each of the computing microservices, said data to be aggregated comprising a sub-part of the accessible data,
generating an aggregated data from the data to be aggregated, by the proxy microservice, from the accessible data determined by each of the computing microservices, and
transmitting the aggregated data, by the proxy microservice, to the aggregated interface of the user client;
wherein the proxy microservice is configured to make several parallel requests to several of said computing microservices and to extract a common set of data from outputs returned by the computing microservices;
wherein the computer system for generating the aggregated data further includes a token security microservice, at least one security repository and at least one authorization repository, said method further comprising a procedure for managing authorizations granted to the user client comprising receiving, by the token security microservice, access information of said user client, authenticating the user client and determining, by the token security microservice, at least one role attribute for the user client from the access command information and data stored in the at least one security repository, generating a token, by the token security microservice, said token allowing an access to all of the plurality of intensive computing solutions accessible to said user client based on the at least one role attribute, and determining the authorizations granted to the user client, by the at least one computing microservice, said determining the authorizations being based on the at least one role attribute and data contained in the at least one authorization repository.

18. A computer system for generating an aggregated data accessible at an aggregated interface of a user client within a framework of unified governance of a plurality of intensive computing solutions, said plurality of intensive computing solutions including at least two solutions among: a high performance computing server, a server dedicated to supervised or unsupervised learning and a server dedicated to quantum computing, the unified governance being ensured at least partly by the computer system for generating the aggregated data, said computer system comprising:

computing microservices comprising at least one computing microservice for each of the plurality of intensive computing solutions, wherein the at least one computing microservice being configured to determine accessible data comprising data accessible to the user client, said determine being based at least partly on access command information;

a proxy microservice configured to receive a message coming from the aggregated interface, said message including said access command information of the user client, determine data to be aggregated from the accessible data determined by each of the computing microservices, generate an aggregated data from the data to be aggregated from the accessible data determined by each of the computing microservices, and transmit the aggregated data to the aggregated interface of the user client;

wherein the proxy microservice is further configured to make several parallel requests to several of said computing microservices and to extract a common set of data from outputs returned by the computing microservices;

a token security microservice;

at least one security repository; and, at least one authorization repository;

wherein said computer system is configured to manage authorizations granted to the user client comprising receiving, by the token security microservice, access information of said user client, authenticating the user client and determining, by the token security microservice, at least one role attribute for the user client from the access command information and data stored in the at least one security repository, generating a token, by the token security microservice, said token allowing an access to all of the plurality of intensive computing solutions accessible to said user client based on the at least one role attribute, and determining authorizations granted to the user client, by the at least one computing microservice, said determining the authorizations being based on the at least one role attribute and data contained in the at least one authorization repository.

* * * * *